UNITED STATES PATENT OFFICE.

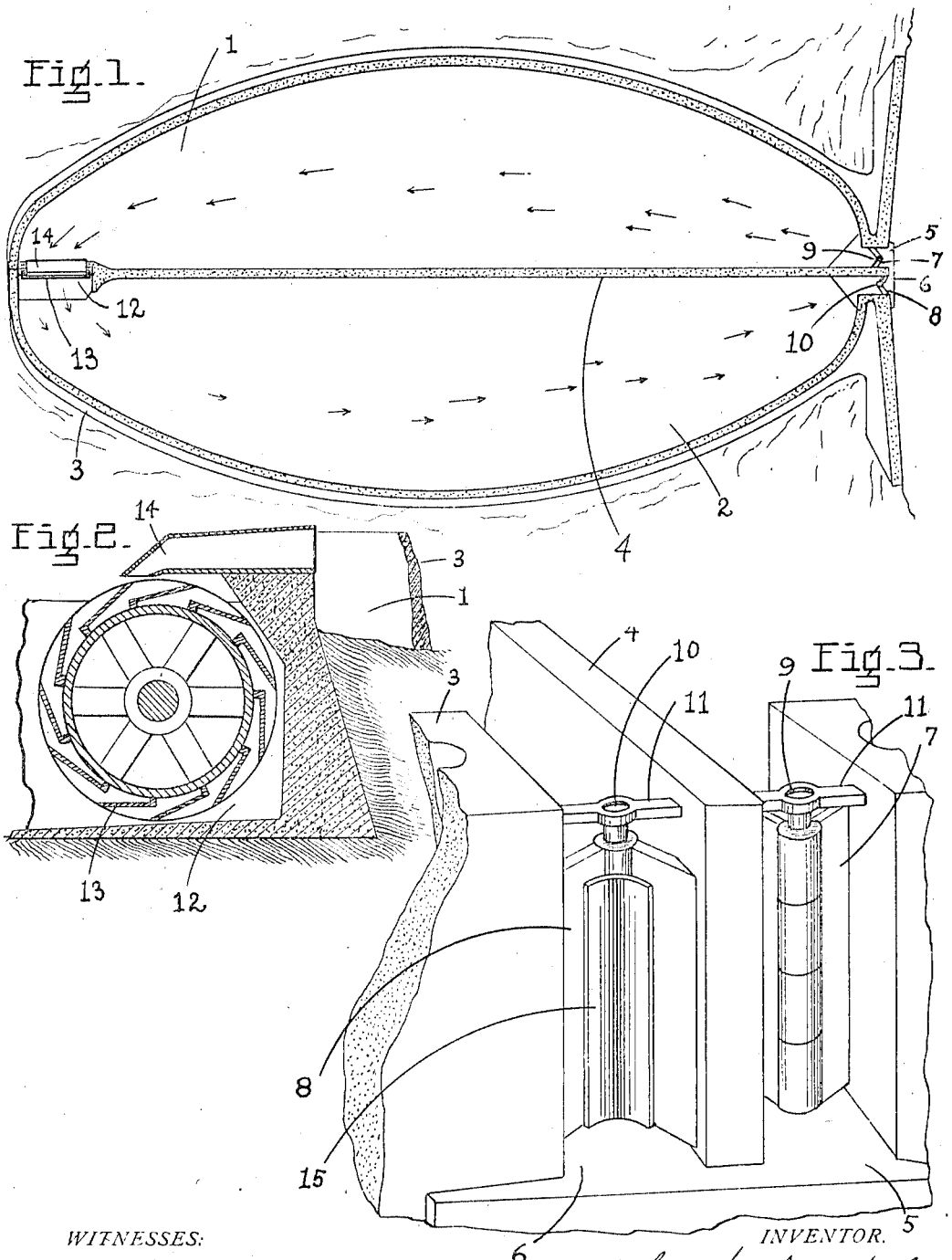

JOHN JOSHUA MILLER, OF SAN DIEGO, CALIFORNIA.

TIDE-LOCK POWER APPARATUS.

1,067,049.  Specification of Letters Patent.  Patented July 8, 1913.

Application filed August 12, 1912. Serial No. 714,612.

*To all whom it may concern:*

Be it known that I, JOHN JOSHUA MILLER, a citizen of the United States, residing at San Diego, in the county of San Diego and State of California, have invented an Improved Tide-Lock Power Apparatus, of which the following is a full and exact description.

This invention relates to an improved means for controlling the tides and obtaining power therefrom, and its principal objects are the provision of simple and convenient apparatus, having the several features and advantages herein specified, which will be effectual to retain and confine a large volume of sea water at high tide and utilize the same in a continuous, uniform, and efficient manner, in the development of mechanical power.

This invention is particularly applicable to low and level tide lands having considerable area, and which are periodically covered each day by the tide water, the invention comprising two adjacent and adjoining sections of tide land having a partition wall therebetween, gates at the entrance to the tide land sections which are automatically controlled by the flow of the tide and which are designed to admit the tide water to the section having the higher level and prevent a return flow of the water to the sea, and which are designed to release the tide water from the section having the lower level when the tide has ebbed to its lowest level, and a water wheel or other mechanical device mounted in a position to be operated by the flow of the tide water from the higher to the lower of said tide land sections.

The principles herein related may be embodied into any suitable form of mechanism and arrangement of parts, provided that they shall be so relatively proportioned and combined as to operate in the manner herein described and to perform the functions herein enumerated, and, therefore, for the purpose of explanation, a preferred form is shown in the accompanying drawings, whereon—

Figure 1 is a plan view of a portion of a tide land to which my apparatus has been applied, disclosing the location of the automatic gates in the division wall between the land and the sea, and the mechanical means for developing power. Fig. 2 is a sectional elevation of the water wheel for developing power, and Fig. 3 is a perspective view of the automatic gates which control the flow of the tide.

Like reference characters apply to like parts in the several views of the invention.

Referring more particularly to the drawing, a portion of a low and level tide land which is so located that it is alternately covered and exposed by tide water is divided into sections 1 and 2, each section being inclosed by an outer suitable concrete wall 3 and a partition wall 4, common to both sections. It is to be understood that these sections may be irregular in form and arranged to conform with the natural depression forming the tide land, but are of approximately equal area, so that the one may be capable of receiving the water delivered by the other section. Walls 3 and 4 are to be higher than the highest tide water. At the seaward ends of said sections, an entrance passage 5 and an exit passage 6 are provided, in which automatic gates 7 and 8, are respectively located. Each gate is provided with leaves which are pivoted to shafts 9 and 10, respectively, the leaves of gate 7 being arranged to swing inwardly to admit the tide water to section 1 when the tide is at its highest level, and the leaves of the other gate being arranged to swing outwardly to release the tide water from section 2 when the tide is at its lowest level. A contrary flow or current of the tide will effect the closure of either gate automatically. Shafts 9 and 10, are braced by transverse bars 11 which are embedded in the concrete wall on either side of the opening. The gate leaves are sufficiently wide to abut obliquely against the side walls when closed, which permits them to be opened by the tide currents. At some point in said partition wall a suitable pit 12 is located having a water wheel 13 mounted therein. In the drawing an over-shot design of wheel is shown, but any desired form of wheel or water motor may be employed for the development of power. A flume 14 delivers the water from the higher level, to the wheel. The bottom of said flume is made approximately twelve inches lower than the highest tide level. A guard 15 is provided for each of said automatic gates, the said guard being made of a heavy and flexible material, preferably of reinforced rubber, and is designed to prevent a leakage through the hinge connections of said gate leaves.

In the drawing a single water wheel or unit for the development of mechanical power is shown, but several of such units may be employed if desired.

In carrying out my invention I do not wish to be limited to the precise construction exhibited in the drawings, but reserve the right to make variations, alterations, and modifications, such as length and other dimensions of the water wheel, of the gates, and of the basins or reservoirs comprising the sections of tide land, also as to the number of gates, wheels, and style of motor, also to make the retaining walls of earth where practical, and other suitable constructions to meet the requirements in compliance with advantages of operation, but which at all times conform to and are included within the scope of the appended claim. It is to be understood that the area of the reservoirs shall be such as to hold sufficient water for the continuous operation of the power developing appliances, and also that the lower reservoir or basin shall be deepened sufficiently to hold the water until released and without interference with the power developing appliances. Arrows indicate the tide movements.

I claim as my invention:

The combination with a concrete wall inclosing tide lands, of a partition wall dividing said inclosed area into two sections, said walls being higher than the highest tide level, and having an entrance passage communicating one section with the sea, and an exit passage communicating the other section with the sea, automatic gates in said passages, one of said gates having swinging leaves adapted to open and admit the inflowing tide to one of said sections and close against its return movement, the other of said gates having swinging leaves adapted to open and release the tide water from the other section, and close against the inflowing tide, flexible and water-proof guards attached to the leaves of said gates, a wheel pit in said partition wall, a water wheel in said wheel pit for developing power, a flume to conduct the water from one of said sections to said water wheel, and means for bracing said gates, substantially as set forth.

In testimony whereof I have affixed my signature to the foregoing specification, this 5th day of August, in the year 1912.

JOHN-JOSHUA MILLER.

In the presence of—
J. W. MASTER,
F. M. KEENEY.